United States Patent
Hamouda

(10) Patent No.: US 9,754,233 B1
(45) Date of Patent: Sep. 5, 2017

(54) CENTRALIZED EMPLOYEE DATA ANALYTICS

(71) Applicant: EMC Corporation, Hopkinton, MA (US)

(72) Inventor: Mahmoud H. Hamouda, Cairo (EG)

(73) Assignee: EMC IP Holding Company LLC, Hopkinton, MA (US)

(*) Notice: Subject to any disclaimer, the term of this patent is extended or adjusted under 35 U.S.C. 154(b) by 573 days.

(21) Appl. No.: 14/145,012

(22) Filed: Dec. 31, 2013

(51) Int. Cl.
*G06Q 10/00* (2012.01)
*G06Q 10/06* (2012.01)

(52) U.S. Cl.
CPC ............... *G06Q 10/06398* (2013.01)

(58) Field of Classification Search
CPC .. G06Q 10/00; G06Q 10/06398; G06Q 40/00; G06Q 17/60; G06F 17/60
USPC ................................. 705/7.12–7.42
See application file for complete search history.

(56) References Cited

U.S. PATENT DOCUMENTS

| | | | | |
|---|---|---|---|---|
| 8,788,308 B1* | 7/2014 | Cox | ............... | G06Q 10/063116 705/7.13 |
| 2004/0128156 A1 | 7/2004 | Beringer et al. | | |
| 2004/0153355 A1* | 8/2004 | Deering | ........... | G06Q 10/06393 705/7.39 |
| 2007/0094595 A1* | 4/2007 | Heck | ...................... | G06Q 10/06 715/700 |
| 2008/0097769 A1* | 4/2008 | Galvin | ............... | G06Q 30/0281 705/346 |
| 2010/0076821 A1* | 3/2010 | Hecker | ................... | G06Q 10/06 705/7.42 |
| 2010/0312713 A1* | 12/2010 | Keltner | .................. | G06Q 10/10 705/317 |
| 2011/0047012 A1* | 2/2011 | Sherman | ................ | G06Q 10/10 705/14.1 |
| 2011/0055264 A1 | 3/2011 | Sundelin et al. | | |
| 2011/0111383 A1 | 5/2011 | Srinivasan et al. | | |
| 2012/0078876 A1* | 3/2012 | Bollen | .............. | G06F 17/30887 707/709 |
| 2012/0215578 A1* | 8/2012 | Swierz, III | ........... | G06Q 50/205 705/7.14 |
| 2013/0006685 A1 | 1/2013 | Kelkar et al. | | |
| 2013/0096991 A1 | 4/2013 | Gardner et al. | | |
| 2013/0111363 A1 | 5/2013 | Linton | | |
| 2013/0185218 A1 | 7/2013 | Hermsdorff et al. | | |
| 2013/0212031 A1 | 8/2013 | Barnfield et al. | | |
| 2013/0226821 A1 | 8/2013 | Chetwynd et al. | | |
| 2013/0253942 A1 | 9/2013 | Liu et al. | | |
| 2013/0262258 A1 | 10/2013 | Jennings | | |
| 2013/0332345 A1 | 12/2013 | Carter | | |
| 2013/0339105 A1 | 12/2013 | Russell et al. | | |

\* cited by examiner

*Primary Examiner* — Romain Jeanty
(74) *Attorney, Agent, or Firm* — Ryan, Mason & Lewis, LLP

(57) ABSTRACT

Systems and methods are provided for centralized employee data analytics. For example, a method includes collecting employee data for one or more employees of an organization from a plurality of data sources, analyzing the collected employee data to determine criteria for use in assessing management skills of employees in the organization, and utilizing the determined criteria to rate an employee's management skills in the organization.

20 Claims, 5 Drawing Sheets

CENTRALIZED EMPLOYEE DATA ANALYTICS

FIELD

The field relates generally to data analytics and, more particularly, to systems and methods for providing centralized employee data analytics.

BACKGROUND

Data analytics typically refers to the science that incorporates various disciplines including, but not limited to, data engineering, mathematics, statistics, computing, and domain-specific expertise. A data scientist is one who practices some or all aspects of data analytics in attempting to solve complex data problems. The application of data analytics is particularly useful to human resources (HR) data. Many companies have a vast amount of employee, HR, and performance data, which is collected from various data sources and processed independently for different purposes. While companies may acquire and maintain various types of information such as employee performance information, educational history, job location, and other types of information about their employees, most companies do not leverage HR data in a beneficial manner. The use of data analytics for HR data would provide a company with beneficial insights that could allow the company to obtain an optimal ROI (return on investment) on its human capital. A challenge of HR analytics is to identify what data should be captured and how to use such captured data to model and predict certain employee capabilities for the company to achieve an optimal ROI on its human capital.

SUMMARY

Embodiments of the invention generally include systems and methods for centralized employee data analytics. In one embodiment, a method includes collecting employee data for one or more employees of an organization from a plurality of data sources, analyzing the collected employee data to determine criteria for use in assessing management skills of employees in the organization, and utilizing the determined criteria to rate the management skills of a given employee in the organization.

In another embodiment, the data sources include an employee performance appraisal system and an employee survey system, wherein collecting employee data includes obtaining manager performance ratings of one or more managers in the organization from the employee performance appraisal system, and obtaining feedback data from employees rating their managers in the organization.

In yet another embodiment, the data sources include an employee messaging system, wherein the collected data includes information from the employee messaging system that indicates a degree to which an employee is connected within the organization. In another embodiment, the collected data comprises information from the employee messaging system that indicates how responsive an employee is to other employees within the organization.

In another embodiment, the data sources include a social network, wherein the collected data comprises information that indicates a degree to which an employee promotes business of the organization within the social network.

In yet another embodiment, the data sources include one or more sensors within an Internet of Things network, wherein the collected data includes information that is obtained about an employee's interactions and work schedules within the organization.

In another embodiment of the invention, the data sources include an external data source from which benchmarking data is obtained regarding management skills of employees in other organizations.

These and other embodiments of the invention will be described in further detail in the following detailed description of embodiments, which is to be read in conjunction with the accompanying drawings.

DETAILED DESCRIPTION

Embodiments of the invention will now be discussed in further detail with regard to systems and methods for providing centralized employee data analytics. For example, illustrative embodiments of the invention include systems and methods to collect and acquire various types of employee data from disparate data sources and leverage the collected data using Big Data analytics, for example, to determine criteria for assessing management skills of employees in a given organization, business, company, enterprise, etc., and use such criteria to rate or otherwise score an employee's management skills in the given organization, business, company, enterprise, etc. The term "organization" as used herein collectively refers to a business entity, an organization, an enterprise, a company, etc.

Figure 1:
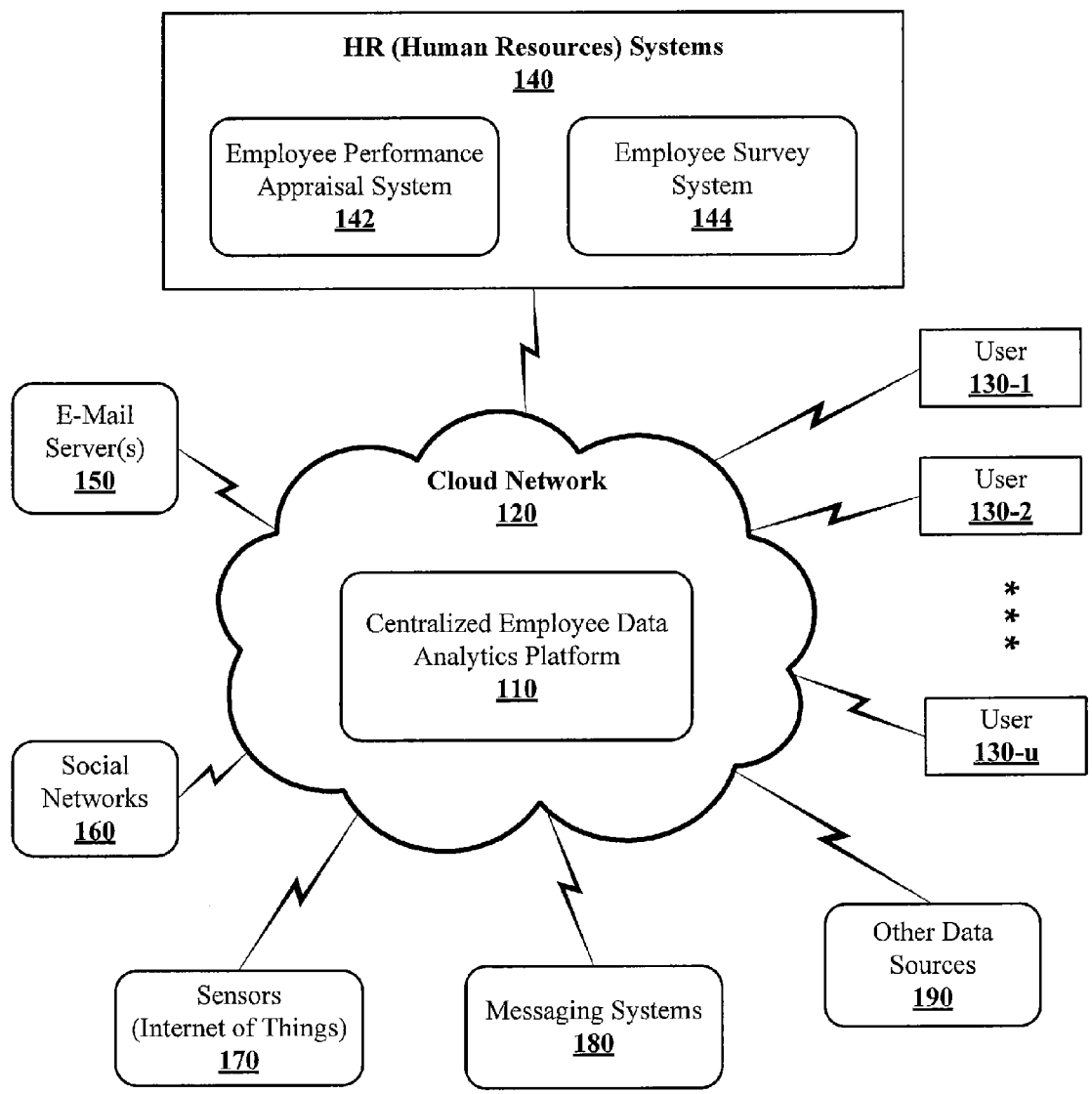
FIG. 1 illustrates an employee data analytics cloud computing system, according to an embodiment of the invention.

FIG. 1 illustrates an employee data analytics cloud computing system 100 according to an embodiment of the invention. The employee data analytics cloud computing system 100 comprises a centralized employee data analytics platform 110, which operates on a cloud network 120. The cloud network 120 may be a private or public cloud network comprising, for example, a global computer network such as the Internet, a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed, so as to encompass a wide variety of different network arrangements, including combinations of multiple networks possibly of different types.

In general, the centralized employee data analytics platform 110 is a software platform that implements program modules to implement various functions including, for example, collecting employee data for employees of an organization, analyzing the collected employee data to determine criteria for use in assessing management skills of employees in the organization, and utilizing the determined criteria to rate an employee's management skills in the organization. In an embodiment where the cloud network 120 is a private cloud network, the centralized employee data analytics platform 110 could be privately operated and managed internally by a given organization. In an embodiment where the cloud network 120 is a public cloud network, the centralized employee data analytics platform 110 can be operated by a third-party service provider that provides employee data analytics services for one or more subscribing organizations.

A plurality of users 130-1, 130-2, . . . , 130-u can access the centralized employee data analytics platform 110 over the cloud network 120. The plurality of users 130-1, 130-2, . . . , 130-u represent employees and/or human resources administrators or personnel from one or more organizations, who can register with the centralized employee data analytics platform 110. More specifically, in a public cloud network embodiment where the centralized employee data analytics platform 110 is operated as a third-party service, the users 130-1, 130-2, . . . , 130-u would include HR administrators or personnel, for example, who would register their organization with the centralized employee data analytics platform 110 to enable access to employee data acquired using their HR systems 140 and obtain employee data analytics services using such employee data. In public and private cloud network embodiments, the users 130-1, 130-2, . . . , 130-u would include employees of the registered organizations who can register one or more additional data sources 150, 160, 170, 180, 190, for example, to provide complementary employee data that can be collected and analyzed by the centralized employee data analytics platform 110 in conjunction with employee data that is typically generated by the HR systems 140 of organizations.

As shown in FIG. 1, the HR systems 140 include an employee performance appraisal system 142 and an employee survey system 144. The employee performance appraisal system 142 can be implemented using commercially available system such as the EPAS application by Oracle. With the employee performance appraisal system 142, supervisors or managers can provide relevant information in an on-line appraisal system to rate the performance of their subordinates, which can be managers or employees that are being considered for promotions to managers, for example. The employee performance appraisal system 142 for a given organization comprises a database that contains employee rating and performance information for each employee of the given organization. The type of employee data within the database of the employee performance appraisal system 142 of a given organization provides top-down employee data that can be processed by the centralized employee data analytics platform 110 to perform functions are discussed in further detail below.

Similarly, the employee survey system 144 can be implemented using a commercially available tool such as the Great Place to Work® application. With the employee survey system 144, employees can provide relevant information in an on-line survey system to rate the performance of their superiors, which can be managers or employees that are being considered for promotions to managers, for example. The employee survey system 144 for a given organization comprises a database that contains rating and performance information for each manger or superior of the given organization. The type of employee data within the database of the employee survey system 144 of a given organization provides bottom-up employee data that can be processed by the centralized employee data analytics platform 110 to perform functions are discussed in further detail below.

In one embodiment of the invention, the centralized employee data analytics platform 110 can combine the top-down employee data (performance ratings) for managers acquired from the employee performance appraisal system 142 with the bottom-up employee data for managers acquired from the employee survey system 144 to evaluate and rate management skills of mangers in a given organization. In other embodiments, complementary employee data can be accessed from other data sources to augment the evaluation and rating process.

For example, complementary employee data can be accessed from employee e-mails of one or more e-mail servers 150. The e-mail servers 150 may be internal e-mail systems of a given organization and/or external e-mail systems outside of the given organization. The e-mails of a given employee can provide relevant information about that employee such as the scope and magnitude of the employee's contacts within and without the given organization, how often the employee interacts and communicates with subordinates, team members, etc., and other information or metadata which may be relevant in assessing the management skills of that employee.

Furthermore, complementary employee data can be accessed from social networks 160 to which the employees subscribe. The term "social network" as used herein generally refers to an online community of people who use a Web site, online service, or other types of computing systems to communicate with each other and share information, data, resources, etc., The term "social network" also refers to the Web site or online service that facilitates such communication. Some common examples of "social networks" include Facebook, Twitter, Flickr, LinkedIn, and Blogger, for example. The participation of a given employee in a social network can provide relevant information about that employee such as the scope and magnitude of the employees contacts within and without the given organization, how the employee promotes the business or goals of the given organization, and other information or metadata which may be relevant in assessing the management skills of that employee.

In addition, complementary employee data can be accessed using various sensors 170 that are included within an "Internet of Things" network. For example, sensor data acquired from various types of sensor devices/systems within a given organization can be utilized to determine and track the time that a given employee spends at work, determine which team members the employee meets with during the day, determine the amount of meetings and the duration of those meetings that the employee engages in on a daily or weekly basis, determine how often and what times the employee may remotely log in to his/her computer at work to conduct business, and otherwise determine other information or metadata which may be relevant in assessing the management skills of that employee.

Moreover, complementary employee data can be accessed from employee messaging systems 180. The messaging systems 180 can include internal or external instant messaging or texting systems. The texts or instant messages of a given employee that are generated via the messaging systems 180 can provide relevant information about that employee such as the scope and magnitude of the employees contacts within and without the given organization, how often the employee interacts and communicates with subordinates and other team members, how quickly the employee responds to messages from team members (i.e., how responsive an employee is to other employees within the organization), and other information or metadata which may be relevant in assessing the management skills of that employee. The messaging systems 180 can include wireless phone systems/services or internal telephone systems of a given organization, wherein metadata acquired from the call history of an employee, such as the recipients of calls from that employee, number of calls on a daily basis to team members by a given employee, for example, can be used to assess the management skills of that employee.

In other embodiments, various types of other data sources 190 can be used to obtain information or metadata which may be relevant in assessing the management skills of employees of a given organization. For example, the other data sources 190 can include on-line data systems of companies that sell benchmarking data from other organizations, wherein the benchmarking data is generally relevant to assessing and evaluating management skills of employees.

Figure 2:
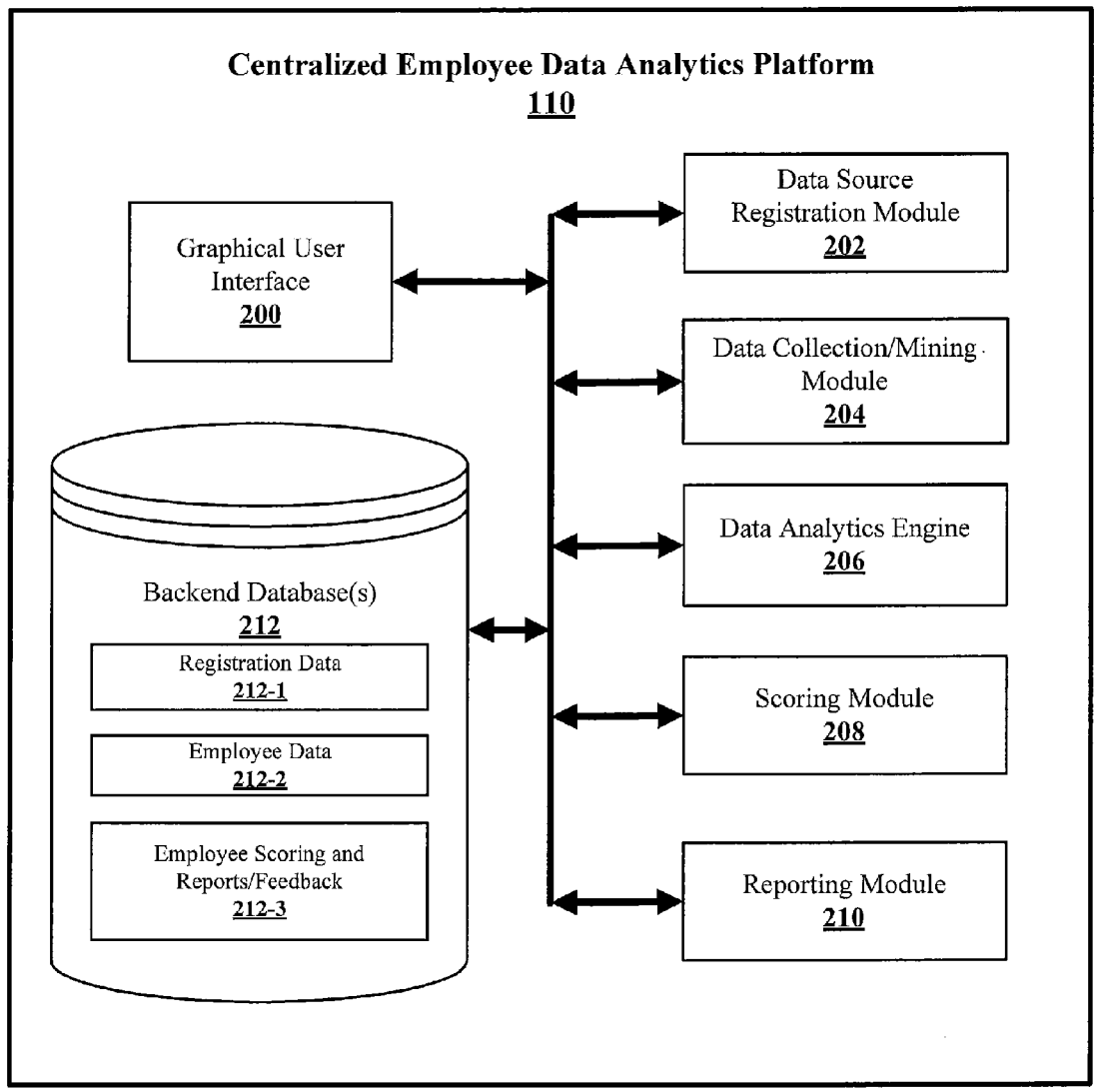
FIG. 2 illustrates a centralized employee data analytics platform to implement the cloud computing system of FIG. 1, according to an embodiment of the invention.

FIG. 2 illustrates a centralized employee data analytics platform to implement the cloud computing system of FIG. 1, according to an embodiment of the invention. More specifically, FIG. 2 illustrates an embodiment of the centralized employee data analytics platform 110 of FIG. 1. As shown in FIG. 2, the centralized employee data analytics platform 110 comprises a graphical user interface 200, a data source registration module 202, a data collection and mining module 204, an employee data analytics engine 206, a scoring module 208, a reporting module 210 and one or more backend database systems 212. In one embodiment of the invention, the various components 200, 202, 204, 206, 208, 210 and 212 are implemented as software modules that are executed by computer processors.

The graphical user interface 200 enables the users (employees, HR administrators, etc.) to access and interact with the centralized employee data analytics platform 110. The data source registration module 202 enables the users to register and otherwise subscribe to the services provided by the centralized employee data analytics platform 110. For example, as noted above, the data source registration module 202 enables HR administrators or personnel to register their organization with the centralized employee data analytics platform 110 to enable access to employee data acquired using their HR systems 140 and obtain employee data analytics services using such employee data. Moreover, the data source registration module 202 enables employees of the registered organizations to register one or more additional data sources 150, 160, 170, 180, 190, as desired, to provide complementary employee data that can be collected and analyzed by the centralized employee data analytics platform 110 in conjunction with employee data that is provided by the HR systems 140 of a registered organization. The registration information input to the data source registration module 202 is stored as registration data 212-1 in the backend database system 212.

The data collection and mining module 204 implements methods to access data sources that are registered with the centralized employee data analytics platform 110 and collect employee data or otherwise performing data mining operations to extract relevant metadata from the registered data sources. As noted above, the type of information that is collected will vary depending on the data sources. For instance, with regard to e-mails and messaging systems, the data collection and mining module 204 may extract information such as the sender and recipient of the e-mails and messages of a given employee to determine which individuals the employee makes contact with on a regular basis (e.g., team members within an organization, or suppliers and customers of the organization, etc.). For social networks and other types of data sources (e-mails and messaging), text and data mining techniques can be implemented to extract information regarding the subject of communications between an employee and other individuals which is relevant to assessing the management skills of an employee. For example, extracting information and content from e-mails, messages, and social network interactions can provide an indication of the degree to which an employee promotes the business of the organization. The data content and metadata that is collected by the data collection and mining module 203 is stored as employee data 212-2 in the backend database system 212.

The employee data analytics engine 206 implements methods to analyze the collected employee data 212-2 to determine criteria for use in assessing management skills of employees in organizations registered with the centralized employee data analytics platform 110. The employee data analytics engine 206 can implement one of various statistical analysis techniques, such as regression analysis, to identify various factors, variables, etc., that are indicative of good management skills or are otherwise predictive of an individual's likelihood of being a successful, effective manager in a given organization. For example, through machine learning and regression analysis of large amounts of employee data over time, and/or through pre-specified criteria, the data analytics engine 206 may determine that the following criteria are indicative of successful management skills: (i) good communication skills with team members; (ii) good organization of planning and scheduling work plans; (iii) team building and support; (iv) leadership and assertive communication; (v) decision making ability; (vi) motivational ability; and (vii) knowledge of the process and tasks being managed. It is to be understood that these factors are merely exemplary, and that other factors and criterion may be considered or otherwise determined with respect to desired management skills of employees depending on the type of the organization and needs of the organization.

The scoring module 208 utilizes the determined criteria to rate an employee's management skills in a given organization. In one embodiment of the invention, the scoring is performed on a per employee data source basis, so that for a given employee, each registered data source would have a score or rating with respect to the determined/specified criteria. The score for a given data source could be a score of 1-10, for example, which score would be relative to an organization-wide average score with regard to employee data obtained from the same type of data source. This embodiment takes into consideration that not every employee will register the same types of employee data sources for use in assessing the employee's management skills. For example, there can be circumstances in which some employees do not register any of the complementary data sources 150, 160, 170, 180, and 190 shown in FIG. 1, for example, and simply rely on the employee data provided by the HR systems 140 of the employee's organization.

In other embodiments, scoring can be performed with regard to a group of data sources. For example, assume that a plurality of employees within a given organization have employee data collected from the organization's HR systems 140 as well as internal e-mail servers 150 and internal messaging systems 180. In this example, since each of the employees have employee data analyzed from the same group of data sources, an overall score can be generated for a group of data sources (e.g., the HR systems 140, and internal e-mail and messaging systems 150, 180). In this embodiment, a given overall score (e.g., 1-10) would be relative to an organization-wide average overall score with regard to employee data obtained from the same group of data sources.

The reporting module 210 generates feedback to an employee in the form of on-line reports that provide ratings information to the employee with regard to the employee's assessed management skills. More specifically, in one embodiment, the reporting module 210 provides an employee with the determined scores and optionally an explanation as to the scope and context with which the scores were generated. In another embodiment, the reporting module 210 provides recommendations for enhancing the employee's management skills. The information generated by the reporting module 210 is stored in the form of employee scoring and reports/feedback documents 212-3 in the backend database system 212.

Figure 3:
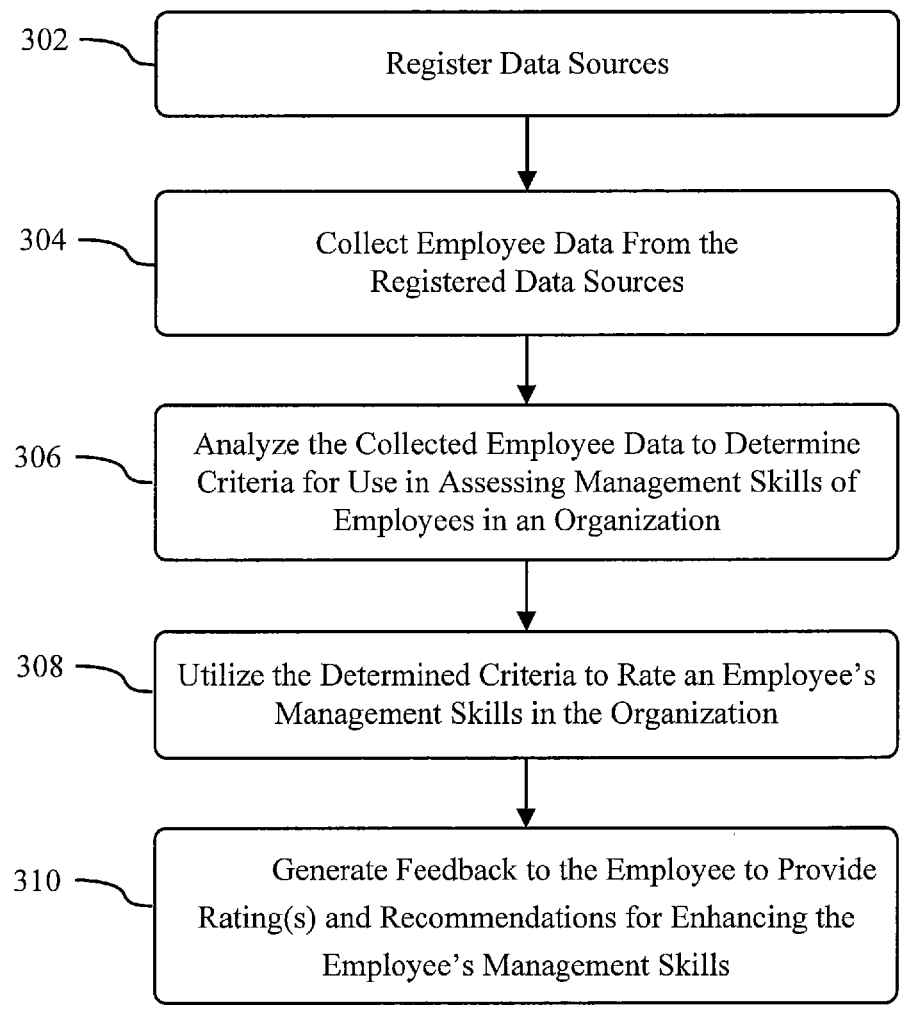
FIG. 3 is a flow diagram of a method for providing centralized employee data analytics, according to an embodiment of the invention.

FIG. 3 is a flow diagram of a method for providing centralized employee data analytics according to an embodiment of the invention. In one embodiment, the method of FIG. 3 illustrates process steps that are implemented by the various processing modules shown in FIG. 2. As noted above, an initial step is for users (HR administrators, employees) to register data sources with the centralized employee data analytics platform 110 (block 302). The centralized employee data analytics platform 110 will collect employee data from the registered data sources (block 304). The centralized employee data analytics platform 110 will analyze the collected employee data to determine criteria for assessing the management skill of employees in a given organization (block 306). The centralized employee data analytics platform 110 will utilize the determined criteria to rate (score) the management skills of a given employee of the organization (block 308). The centralized employee data analytics platform 110 will then generate feedback to the employee to provide the determined ratings and possibly provide recommendations for enhancing the management skills of the employee (block 310).

Figure 4:
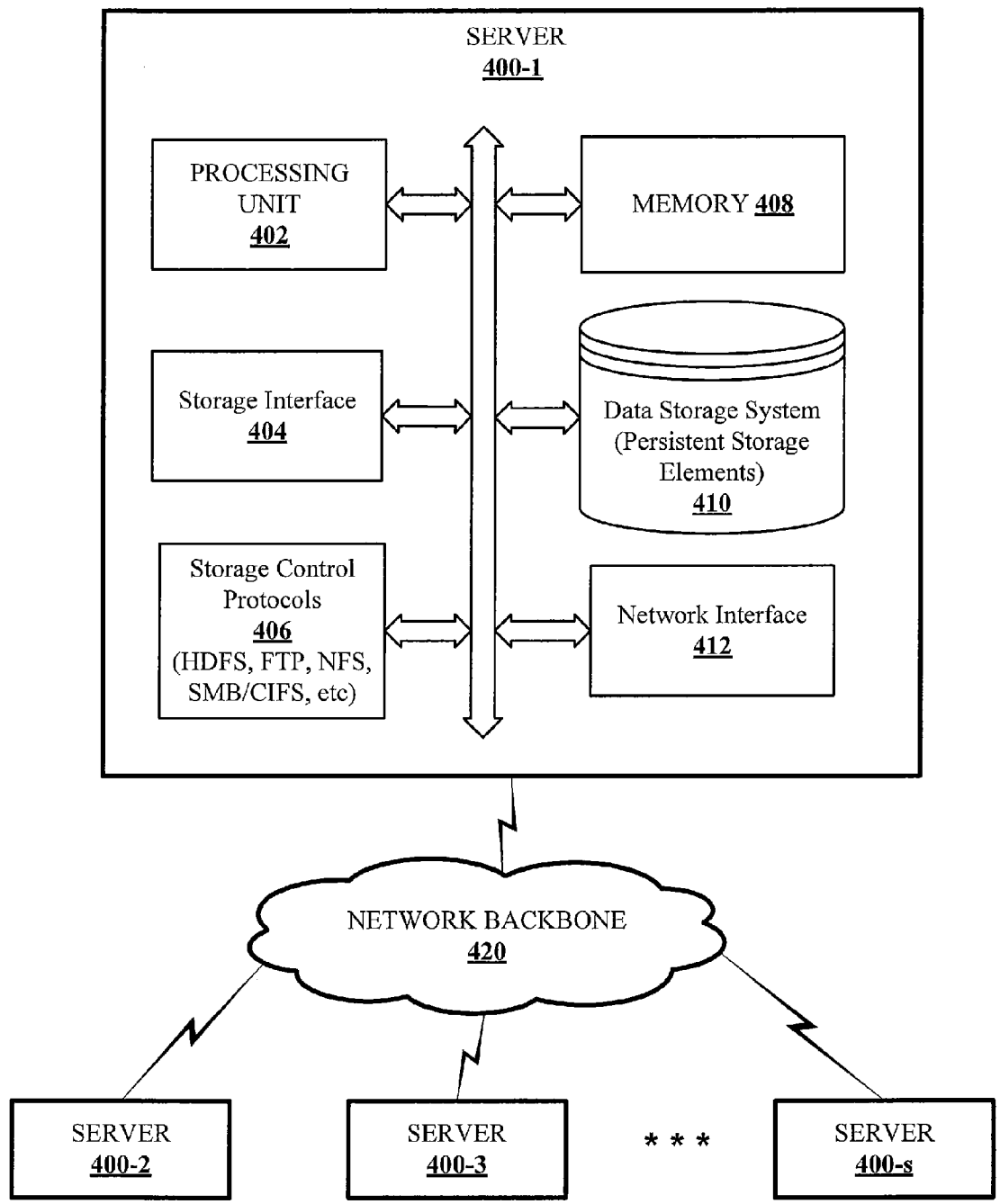
FIG. 4 illustrates a computing system to implement the centralized employee data analytics platform of FIG. 2, according to an embodiment of the invention.

FIG. 4 illustrates a computing system 400 to implement the centralized employee data analytics platform 110 of FIG. 2, according to an embodiment of the invention. The computing system 400 comprises a plurality (s) of servers 400-1, 400-2, 400-3, . . . , 400-s, which communicate with one another over a network 420. The plurality of servers 400-1, 400-2, 400-3, . . . , 400-s include a combination of application servers and data storage servers for performing data computing and storage functions that support various functions of the centralized employee data analytics platform 110 as discussed above with reference to FIGS. 2 and 3, for example. It is to be understood that the computing system 400 shown in FIG. 4 may represent cluster of servers that reside in a single facility (e.g., data center facility of private company) or a cluster of servers that reside in remote locations (distributed over a cloud network) of a given service provider, for example. The network 420 may comprise various networks as discussed above with reference to FIG. 1, wherein the network 420 may encompass a wide variety of different network arrangements, including combinations of multiple networks possibly of different types.

As shown in FIG. 4, the server 400-1 comprises a processing unit 402, storage interface circuitry 404, storage control protocols 406, system memory 408, a data storage system comprising one or more persistent storage elements 410, and network interface circuitry 412. The processing unit 402 comprises one or more of a computer processor, a microprocessor, a microcontroller, an application-specific integrated circuit (ASIC), a field programmable gate array (FPGA) or other type of processing circuitry, as well as portions or combinations of such circuitry elements. The network interface circuitry 412 enables the server 400-1 to interface and communicate with the network 420 and other system components. The network interface circuitry 412 may comprise conventional transceivers of a type well known in the art.

The storage interface circuitry 404 enables the server 400-1 to interface with storage devices and control the storage of employee data and other data (e.g., ratings, reports, feedback, etc.) associated with the centralized employee data analytics platform 110. The storage interface circuitry 404 utilizes file system metadata and/or namespace metadata to manage a file system for one or more namespace volumes. Moreover, the storage interface circuitry 404 utilizes one or more of the storage control protocols 406 to read, write and otherwise access data in the persistent storage elements 410, such as flash memory devices, DAS (direct attached storage) devices, NAS (network-attached storage) devices, etc., depending on the storage system utilized. For example, the storage control protocols 406 may include known protocols such as HDFS (Hadoop Distributed File System), NFS (network file system), FTP (file transfer protocol), and/or SMB (Server Message Block)/CIFS (Common Internet File System) protocols, for example.

Furthermore, the system memory 408 comprises electronic memory such as random access memory (RAM), read-only memory (ROM) or other types of memory, in any combination. The system memory 408 stores one more software programs having instructions that are read and processed by the processing unit 402 to implement various functions associated with the various system modules 200, 202, 204, 206, 208, 210 and 212, discussed above with reference to FIG. 2. The system memory 408 (or other storage device) having such program code tangibly embodied thereon is an example of what is more generally referred to herein as a processor-readable storage medium. Other examples of processor-readable storage media embodying program code include, for example, optical or magnetic disks. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

It is to be understood that the other servers 400-2, 400-3, . . . , 400-s of the computing system 400 shown in FIG. 4 may be configured in a manner that is the same or similar to the architecture of the server 400-1. The constituent components and modules of a given server can vary depending on whether the given server operates as an application server, a data storage server, or both. The computing system 400 shown in FIG. 4 may comprise additional known components such as batch processing systems, parallel processing systems, physical machines, virtual machines, virtual switches, storage volumes, logical units, etc. Again, the particular computing system 400 shown in FIG. 4 is presented by way of example only, and the computing system 400 may include additional or alternative processing platforms, as well as numerous distinct processing platforms in any combination. It is to be noted that the phrases "computing system" and "data storage system" as used herein are intended to be broadly construed, so as to encompass, for example, private or public cloud computing or storage systems, as well as other types of systems comprising distributed virtual and/or physical infrastructure.

Figure 5:
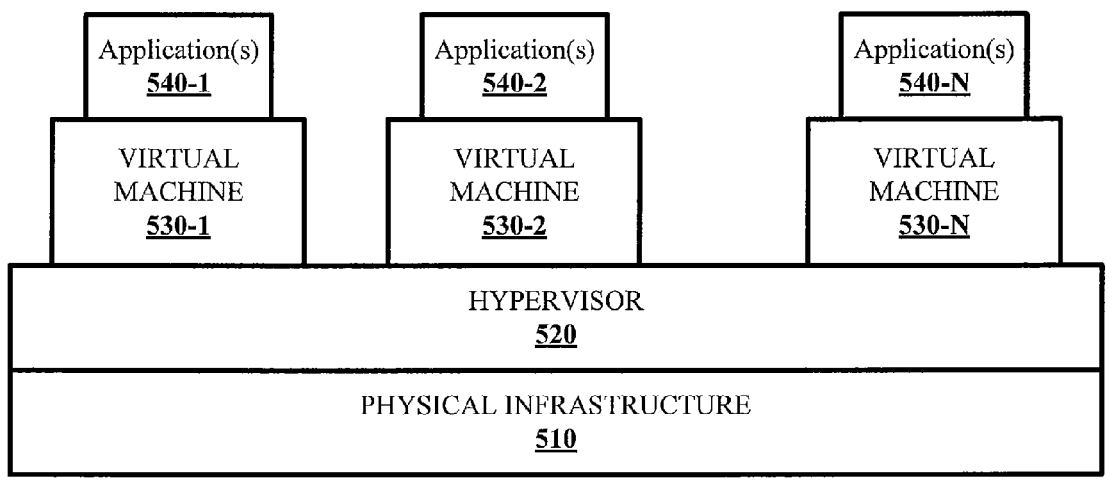
FIG. 5 illustrates a computing system to implement the centralized employee data analytics platform of FIG. 2, according to another embodiment of the invention.

FIG. 5 illustrates a computing system 500 to implement the centralized employee data analytics platform 110 of FIG. 2, according to another embodiment of the invention. In particular, FIG. 5 illustrates the use of virtual machines (VMs) that are implemented using a hypervisor. More specifically, the computing system 500 of FIG. 5 comprises virtual machines (VMs) 530-1, 530-2, . . . 530-N implemented using a hypervisor 520. The hypervisor 520 runs on physical infrastructure 510. The computing system 500 further comprises sets of applications 540-1, 540-2, . . . 540-N running on respective ones of the virtual machines 530-1, 530-2, . . . , 530-N under the control of the hypervisor 520. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor 520 runs on the physical infrastructure 510, e.g., CPUs and/or storage devices.

In another embodiment, a computing system can be implemented with multiple hypervisors, each running on its own physical infrastructure, wherein portions of that physical infrastructure may be virtualized. An example of a commercially available hypervisor platform that may be used to implement portions of the computing system 500 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.).

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
executing a data analytics platform on one or more servers of a cloud network;
executing an automated process by the data analytics platform, which comprises:
executing a data collection and mining engine of the data analytics platform to: (i) automatically access a plurality of disparate data sources of employee information over one or more networks coupled to the cloud network; (ii) mine the plurality of disparate data sources to extract employee data for a plurality of employees of an organization from the plurality of disparate data sources, wherein the extracted employee data comprises information that is relevant to assessing management skills; and (iii) store the extracted employee data in a centralized database of the data analytics platform;
executing a data analytics engine of the data analytics platform which utilizes machine learning and statistical analysis methods to automatically analyze the extracted employee data stored in the centralized database of the data analytics platform and automatically learn criteria that is utilized to assess management skills of employees in the organization; and
storing the learned criteria in the centralized database of the data analytics platform;
rendering, by the data analytics platform, a graphical user interface which is configured to allow a user to submit a service request to the data analytics platform;
receiving, by the data analytics platform, a user request for an employee data analytics service which is submitted through the graphical user interface;
servicing said received user request by the data analytics platform, wherein servicing said received user request comprises:
accessing employee data for a given employee which is stored in the centralized database;
executing a scoring engine of the data analytics platform to process said accessed employee data for the given employee utilizing said learned criteria to rate management skills of the given employee in the organization; and
executing a reporting engine of the data analytics platform to provide feedback to said requesting user regarding the given employee, wherein said feedback comprises a rating of the given employee's management skills in the organization as automatically determined by the scoring engine,
wherein the automated process executed by the data analytics platform is performed under the control of one or more processor devices that reside on the one or more servers of the cloud network.

2. The method of claim 1, wherein the disparate data sources comprise an employee performance appraisal system, and wherein collecting employee data comprises obtaining manager performance ratings of one or more managers in the organization from the employee performance appraisal system.

3. The method of claim 1, wherein the disparate data sources comprise an employee survey system, and wherein collecting employee data comprises obtaining feedback data from employees rating their managers in the organization.

4. The method of claim 1, wherein the disparate data sources comprise an employee messaging system, wherein the collected data comprises information from the employee messaging system that indicates a degree to which an employee is connected within the organization.

5. The method of claim 1, wherein the disparate data sources comprise an employee messaging system, wherein the collected data comprises information from the employee messaging system that indicates how responsive an employee is to other employees within the organization.

6. The method of claim 1, wherein the disparate data sources comprise a social network, wherein the collected data comprises information that indicates a degree to which an employee promotes business of the organization within the social network.

7. The method of claim 1, wherein the disparate data sources comprise one or more sensors within an Internet of Things network, wherein the collected data comprises information that is obtained about an employee's interactions and work schedules within the organization.

8. The method of claim 1, wherein the disparate data sources comprise an external data source from which benchmarking data is obtained regarding management skills of employees in other organizations.

9. The method of claim 1, wherein executing the scoring engine to utilize the learned criteria to rate the at least one employee's management skills in the organization comprises executing the scoring engine to generate a score for the at least one employee which rates the management skills of the at least one employee relative to the management skills of other employees within the organization.

10. The method of claim 9, wherein the score is specific with regard to data collected for a given one of the data sources.

11. The method of claim 9, wherein the score is specific with regard to data collected for a group of two or more of the data sources.

12. The method of claim 1, further comprising executing the reporting engine to provide a recommendation for enhancing the management skills of the at least one employee.

13. An article of manufacture comprising a processor-readable storage medium having encoded therein executable code of one or more software programs, wherein the one or more software programs when executed by the at least one processing device implement a method comprising:

执行 executing a data analytics platform on one or more servers of a cloud network;
executing an automated process by the data analytics platform, which comprises:
executing a data collection and mining engine of the data analytics platform to: (i) automatically access a plurality of disparate data sources of employee information over one or more networks coupled to the cloud network; (ii) mine the plurality of disparate data sources to extract employee data for a plurality of employees of an organization from the plurality of disparate data sources, wherein the extracted employee data comprises information that is relevant to assessing management skills; and (iii) store the extracted employee data in a centralized database of the data analytics platform;
executing a data analytics engine of the data analytics platform which utilizes machine learning and statistical analysis methods to automatically analyze the extracted employee data stored in the centralized database of the data analytics platform and automatically learn criteria that is utilized to assess management skills of employees in the organization; and
storing the learned criteria in the centralized database of the data analytics platform;
rendering, by the data analytics platform, a graphical user interface which is configured to allow a user to submit a service request to the data analytics platform;
receiving, by the data analytics platform, a user request for an employee data analytics service which is submitted through the graphical user interface;
servicing said received user request by the data analytics platform, wherein servicing said received user request comprises:
accessing employee data for a given employee which is stored in the centralized database;
executing a scoring engine of the data analytics platform to process said accessed employee data for the given employee utilizing said learned criteria to rate management skills of the given employee in the organization; and
executing a reporting engine of the data analytics platform to provide feedback to said requesting user regarding the given employee, wherein said feedback comprises a rating of the given employee's management skills in the organization as automatically determined by the scoring engine.

14. An apparatus, comprising:
a processor, and
a memory coupled to the processor, wherein the memory comprises program instructions that are executed by the processor to implement a process comprising:
executing a data analytics platform on one or more servers of a cloud network;
executing an automated process by the data analytics platform, which comprises:
executing a data collection and mining engine of the data analytics platform to: (i) automatically access a plurality of disparate data sources of employee information over one or more networks coupled to the cloud network; (ii) mine the plurality of disparate data sources to extract employee data for a plurality of employees of an organization from the plurality of disparate data sources, wherein the extracted employee data comprises information that is relevant to assessing management skills; and (iii) store the extracted employee data in a centralized database of the data analytics platform;
executing a data analytics engine of the data analytics platform which utilizes machine learning and statistical analysis methods to automatically analyze the extracted employee data stored in the centralized database of the data analytics platform and automatically learn criteria that is utilized to assess management skills of employees in the organization; and
storing the learned criteria in the centralized database of the data analytics platform;
rendering, by the data analytics platform, a graphical user interface which is configured to allow a user to submit a service request to the data analytics platform;
receiving, by the data analytics platform, a user request for an employee data analytics service which is submitted through the graphical user interface;
servicing said received user request by the data analytics platform, wherein servicing said received user request comprises:
accessing employee data for a given employee which is stored in the centralized database;
executing a scoring engine of the data analytics platform to process said accessed employee data for the given employee utilizing said learned criteria to rate management skills of the given employee in the organization; and
executing a reporting engine of the data analytics platform to provide feedback to said requesting user regarding the given employee, wherein said feedback comprises a rating of the given employee's management skills in the organization as automatically determined by the scoring engine.

15. The apparatus of claim 14, wherein the disparate data sources comprise an employee performance appraisal system and an employee survey system, wherein collecting employee data comprises obtaining manager performance ratings of one or more managers in the organization from the employee performance appraisal system, and obtaining feedback data from employees rating their managers in the organization.

16. The apparatus of claim 14, wherein the disparate data sources comprise an employee messaging system, wherein the collected data comprises information from the employee messaging system that indicates a degree to which an employee is connected within the organization.

17. The apparatus of claim 14, wherein the disparate data sources comprise an employee messaging system, wherein the collected data comprises information from the employee messaging system that indicates how responsive an employee is to other employees within the organization.

18. The apparatus of claim 14, wherein the disparate data sources comprise a social network, wherein the collected data comprises information that indicates a degree to which an employee promotes business of the organization within the social network.

19. The apparatus of claim 14, wherein the disparate data sources comprise one or more sensors within an Internet of Things network, wherein the collected data comprises information that is obtained about an employee's interactions and work schedules within the organization.

20. The apparatus of claim 14, wherein the disparate data sources comprise an external data source from which benchmarking data is obtained regarding management skills of employees in other organizations.

\* \* \* \* \*